July 6, 1937.  F. C. MOCK  2,086,427
CYLINDER HEAD FOR INTERNAL COMBUSTION ENGINES
Filed Aug. 2, 1933
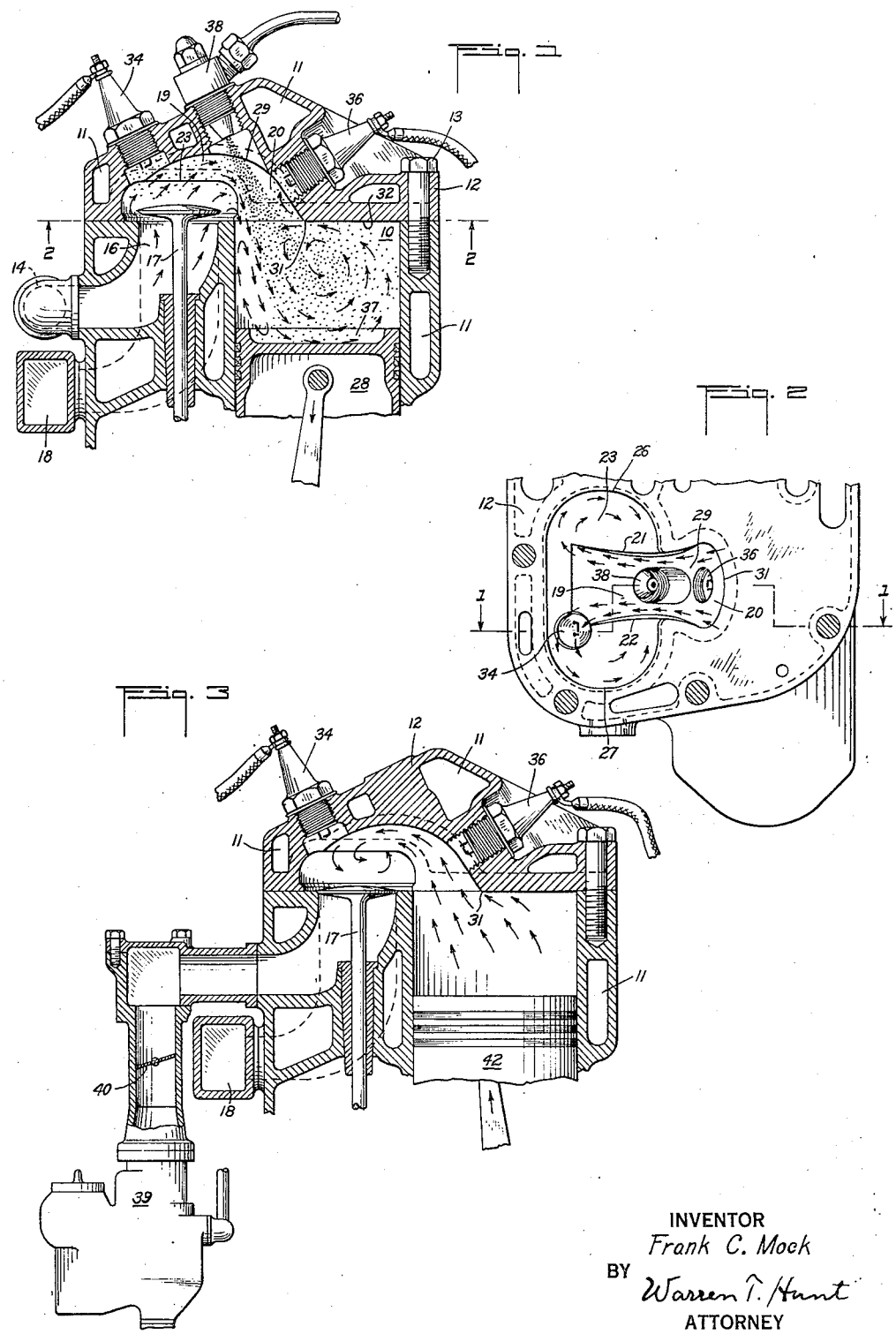
INVENTOR
Frank C. Mock
BY
Warren T. Hunt
ATTORNEY Patented July 6, 1937

2,086,427

UNITED STATES PATENT OFFICE 2,086,427

CYLINDER HEAD FOR INTERNAL COMBUSTION ENGINES

Frank C. Mock, Montclair, N. J., assignor to Eclipse Aviation Corporation, East Orange, N. J., a corporation of New Jersey Application August 2, 1933, Serial No. 683,379

3 Claims. (Cl. 123—32)

This invention relates to internal combustion engines and more particularly to an improved combustion chamber and passageway for connecting the chamber with the engine cylinder.

An object of the invention is to provide an internal combustion engine in which the fuel and air are properly mixed prior to ignition.

Another object of the invention is to so design the combustion chamber and connecting passage that the fuel and air will be directed into the cylinder with a heterogeneous turbulence (as distinguished from a stream-line whirling motion), during the intake stroke of the engine, and will be re-directed back into the combustion chamber with similar turbulence during the compression stroke.

Another object of the invention is to provide an engine of the fuel injection type in which the fuel is directed through a jet of air and against the piston head.

Other objects of the invention will be apparent from the following description in connection with which certain embodiments of the invention have been illustrated in the accompanying drawing in which:

Fig. 1 is a sectional elevational view of an engine constructed according to the invention;

Fig. 2 is a plan view taken along the line 2—2 of Fig. 1; and

Fig. 3 is a sectional elevation showing the invention as adapted to an engine equipped with a carburetor.

Difficulty has heretofore been encountered in connection with internal combustion engines in obtaining a homogeneous mixture of air and fuel prior to ignition and the present invention contemplates a construction in which the combustion chamber is offset from the cylinder and substantially tangent thereto, the connection between the cylinder and chamber being by means of a narrow curved passageway preferably curved toward the piston and which passageway serves both to increase the velocity of the incoming charge beyond that which is ordinarily encountered to deliver this charge in the form of a jet, off center of the main chamber space; and also to re-direct this charge back into the combustion chamber in a similar jet during the compression stroke, at a high velocity. On plan view, this passageway forms the stem of a capital letter T of which the valve chamber forms the cross bar. The side walls of the passageway preferably intersect the top wall of the combustion chamber at substantially right angles which causes the gases to be directed into the combustion chamber over substantially sharp shoulders which produce turbulence and materially contribute to the formation of a homogeneous mixture. Beyond the corners the passageway may have a Venturi tube or stream-line shape, if it is desired to reduce the combustion chamber volume and still retain adequate area of passage, which should be preferably 1 to 1½ times the maximum area of the intake valve opening and should be of square, short rectangular, or other compact section to force a jet of air that will have the minimum viscous drag against the relatively quiescent air surrounding it and thereby penetrate and maintain high velocity all the way down to the bottom of the cylinder chamber.

Another feature of the construction relates to the cylinder head which has a passage therein with a curved top contour, which directs the air charge downward against the piston on the suction stroke; and on the compression stroke directs the gas from the cylinder space into the valve chamber from above as well as from the side, thus setting up vortices in a number of different planes.

Referring to the drawing, the cylinder 10 is provided with the usual water jacket spaces 11 and has its upper end closed by a head 12 secured to the shoulder by bolts 13. Communication to the cylinder from the outside air is by means of intake passage 14 and through the port 16 which is controlled by intake valve 17, the exhaust being through exhaust passage 18 controlled by a similar valve (not shown) arranged immediately behind valve 17 as viewed in Figs. 1 and 3. Within head 12 is formed a combustion chamber 19 preferably arranged tangent to cylinder 10. The combustion chamber 19 is connected with cylinder 10 by means of a narrow passage 20 having side walls 21 and 22 which are substantially at right angles to the flat top wall 23 of the combustion chamber and produce turbulence of the incoming charge as shown by arrows in Fig. 1. The passageway 20 is arranged substantially midway of the curved end portions 26 and 27 of the combustion chamber 19 and has a width that is narrower than either the length of the combustion chamber or the diameter of the cylinder. The top wall of the passageway is curved downwardly in the direction of piston 28 whereby the incoming charge is directed through the passageway at high velocity and with a turbulent motion as shown by the arrows in Fig. 1. The intersection of the curved top wall 29 preferably forms a sharp edge or corner 31 with the flat top wall 32 of the cylinder 10 whereby on the compression stroke the compressed charge, which is being forced back into the combustion chamber, will encounter shoulder 31 and the sharp edges formed by the intersection of side walls 21 and 22 with the top wall of the combustion chamber. Ignition means such as spark plug 34 is arranged to communicate with the combustion chamber and is preferably located adjacent the side wall 22 of the communicating passage in which position it will be swept by the compressed charge, as illustrated by the arrows in Fig. 2. A second spark plug 36 is located in the passageway intermediate the combustion chamber and cylinder, although if desired, either one of the spark plugs may be omitted, it being the preferred arrangement to retain spark plug 34 in case that only one plug is used.

Piston 28 is provided with a cup-shaped depression 37 against which the incoming charge is directed and serves to re-direct the incoming charge in a whirling motion which has been initiated by the curved connecting passageway 20. A fuel injector 38 is located in the top wall of the passageway 20 and is so arranged as to inject fuel through the passageway and the whirling air within the cylinder onto the cup-shaped piston head 37 which during the running of the engine is heated to a high temperature. The injecting of the fuel directly against the piston head is very desirable in that it not only serves to vaporize the fuel but also to cool the piston head which at times reaches a temperature much higher than is desired.

In Fig. 3 a similar arrangement of combustion chamber and connecting passageway has been shown as installed on an engine equipped with a carburetor 39, the usual throttle valve being illustrated at 40. In this form of the invention, the piston 42 is of the conventional flat-head form and is shown on the compression stroke during which the compressed charge is forced past shoulder 31 into the passage. During the compression stroke the charge is re-directed against a plurality of sharp edges which cause the charge to whirl in a number of directions whereby the fuel and air is thoroughly co-mingled and reduced to a homogeneous mixture that may be easily ignited. The curved top wall of the passageway produces a whirl in the combustion chamber having a horizontal longitudinal axis as illustrated by the arrows in Fig. 3, and the curved end walls 26 and 27 cause the charge to produce whirls about a vertical axis as illustrated in Fig. 2.

Tests upon an engine equipped with a combustion chamber and passageway constructed according to the above description showed that the improved construction decreases the fuel consumption of a well-known engine to .46 pound per H. P. hour with 5 to 1 volumetric compression ratio as compared to about .6 pound per horsepower hour which was the best consumption of the standard engine with conventional combustion chamber and 4 to 1 compression ratio, it being apparent that the turbulence gained by this construction is beneficial in allowing higher compression ratios as well as permitting the use of leaner fuel and air mixtures.

While certain embodiments of the invention have been illustrated and described, it is understood that this showing and description are illustrative only and that the invention is not considered as limited to the forms shown and described, or otherwise, except by the terms of the following claims:

What is claimed is:

1. In an internal combustion engine, a cylinder, a piston adapted to reciprocate therein, a combustion chamber offset from the cylinder having a flattened top wall, means forming a passageway between the cylinder and combustion chamber, said passageway being symmetrically arranged with respect to both said cylinder and said chamber, said passageway having side walls substantially perpendicular to the top wall of the combustion chamber and intersecting the same at substantially a right angle and forming a sharp edge at the intersection, said passageway having an opening in the top wall of the cylinder, fuel injection means in said passageway arranged to direct fuel against the head of the piston, and ignition means in the top wall of said passageway arranged between said fuel injection means and said cylinder.

2. In an internal combustion engine, a cylinder having a piston adapted to reciprocate therein, a combustion chamber offset from the cylinder, said chamber being symmetrical with respect to a cylinder radius having curved ends and being substantially tangent to said cylinder, said chamber having a flat top wall, means forming a passageway between the chamber and the cylinder, said passageway being symmetrically arranged with respect to both said cylinder and said chamber, said passageway being of less width than the length of the combustion chamber and having side walls intersecting the combustion chamber wall at substantially a right angle and forming a sharp edge at the intersection, said passageway having a curved top wall for directing incoming gases toward said piston, and a pair of fuel igniters in said passageway one of which is nearer the engine cylinder than the other and a fuel injector in said passageway arranged between said igniters.

3. In an internal combustion engine, a cylinder having a piston adapted to reciprocate therein, a combustion chamber offset from the cylinder, said chamber having curved ends and being substantially tangent to said cylinder, said chamber having a flat top wall, means forming a passageway between the chamber and the cylinder, said passageway being symmetrically arranged with respect to both said cylinder and said chamber, said passageway being of less width than the length of the combustion chamber and having side walls substantially perpendicular to the chamber top wall and intersecting the same at substantially a right angle and forming a sharp edge at the intersection, said passageway having a curved top wall for directing incoming gases toward said piston, a fuel injector in said passageway arranged to inject fuel against said piston, and a fuel igniter in said passageway arranged between said injector and said cylinder.

FRANK C. MOCK.